United States Patent
An et al.

(10) Patent No.: US 8,773,772 B2
(45) Date of Patent: Jul. 8, 2014

(54) PHOTOGRAPHIC LENS OPTICAL SYSTEM

(75) Inventors: Chi Ho An, Seongnam-si (KR); Pil Sun Jung, Seongnam-si (KE); Jae Hoon Cho, Seongnam-si (KR); Ji Eun Kim, Seongnam-si (KR); Chan Goo Kang, Seongnam-si (KR)

(73) Assignee: Kolen Co., Ltd. (KR)

(*) Notice: Subject to any disclaimer, the term of this patent is extended or adjusted under 35 U.S.C. 154(b) by 8 days.

(21) Appl. No.: 13/588,583

(22) Filed: Aug. 17, 2012

(65) Prior Publication Data

US 2013/0265652 A1    Oct. 10, 2013

(30) Foreign Application Priority Data

Apr. 6, 2012 (KR) .................. 10-2012-0036278

(51) Int. Cl.
*G02B 13/18* (2006.01)
*G02B 9/34* (2006.01)
*G02B 13/00* (2006.01)

(52) U.S. Cl.
CPC ............ *G02B 13/004* (2013.01); *G02B 13/18* (2013.01)
USPC ........................................ 359/715; 359/771

(58) Field of Classification Search
CPC ...... G02B 9/34; G02B 13/002; G02B 13/004; G02B 13/18
USPC ................... 348/340; 359/715, 771, 772, 773
See application file for complete search history.

(56) References Cited

U.S. PATENT DOCUMENTS

2011/0254992 A1* 10/2011 Abe .............................. 348/340
2012/0002302 A1* 1/2012 Cho .............................. 359/715

FOREIGN PATENT DOCUMENTS

| JP | 2011227131 A | 11/2011 |
| KR | 100790716 B1 | 1/2008 |
| KR | 20080073422 A | 8/2008 |
| KR | 100856225 B1 | 9/2008 |

OTHER PUBLICATIONS

Korean Intellectual Property Office Notice of Allowance Application No. 10-2012-0036278 Issued: Nov. 21, 2013 2 pages.
Office Action from Korean Industrial Property Office Application No. 119990546341 Issued: Jun. 7, 2013 8 pages.

* cited by examiner

*Primary Examiner* — David N Spector
(74) *Attorney, Agent, or Firm* — St. Onge Steward Johnston & Reens LLC

(57) ABSTRACT

A lens optical system includes first, second, third, and fourth lenses that are arranged between an object and an image sensor, in order from an object side, wherein the first lens has positive refractive power and an incident surface that is convex toward the object, the second lens has negative refractive power and both surfaces of which are concave, the third lens has positive refractive power and a meniscus shape that is convex toward the image sensor, and the fourth lens has negative refractive power and at least one of an incident surface and an exit surface of which is an aspherical surface, wherein the system satisfies the inequality, 3.0<*TTL/BL*<3.4, wherein TTL is a distance from the incident surface of the first lens to the image sensor and BL is a distance from the exit surface of the fourth lens to the image sensor.

15 Claims, 6 Drawing Sheets

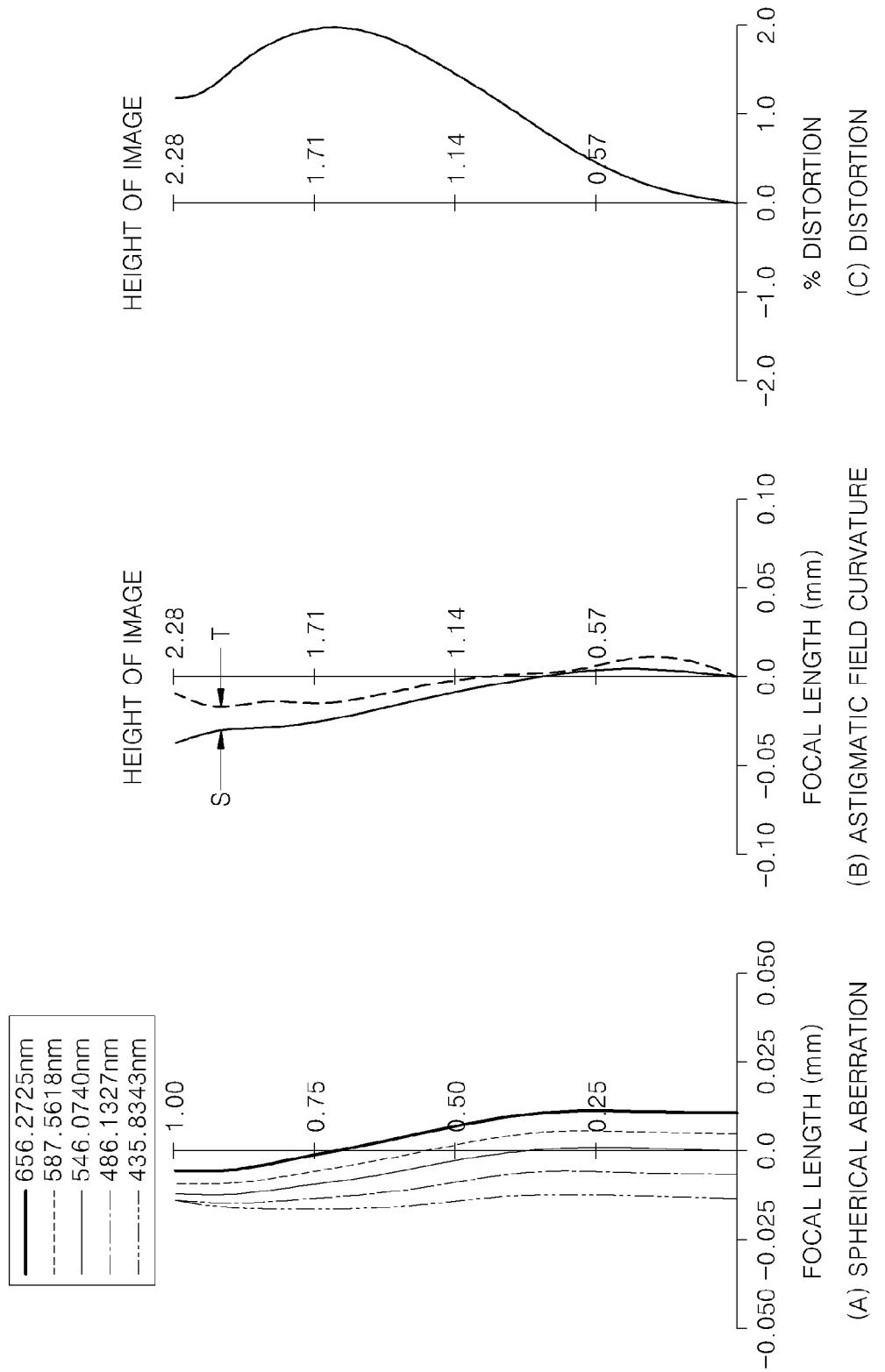

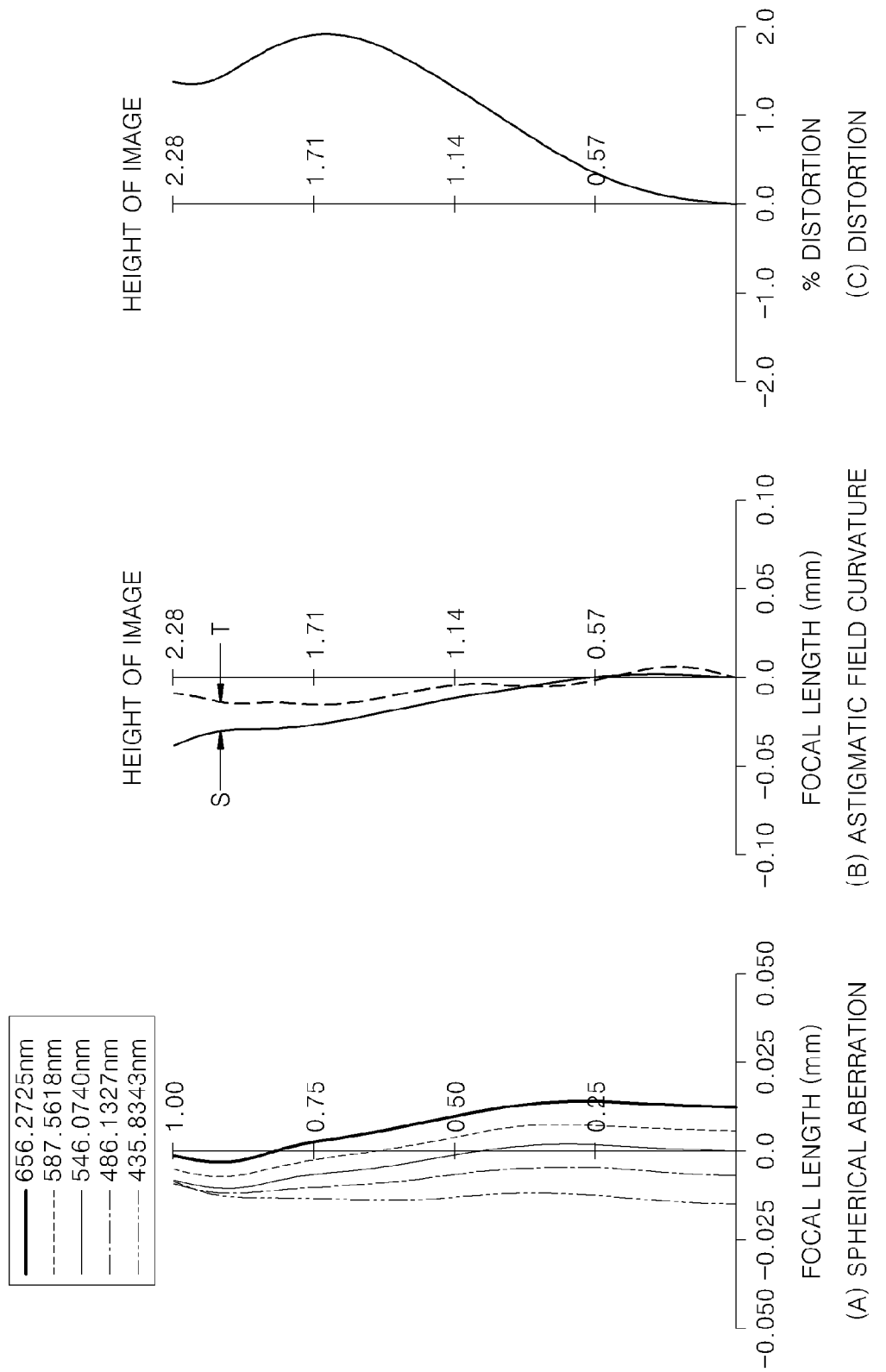

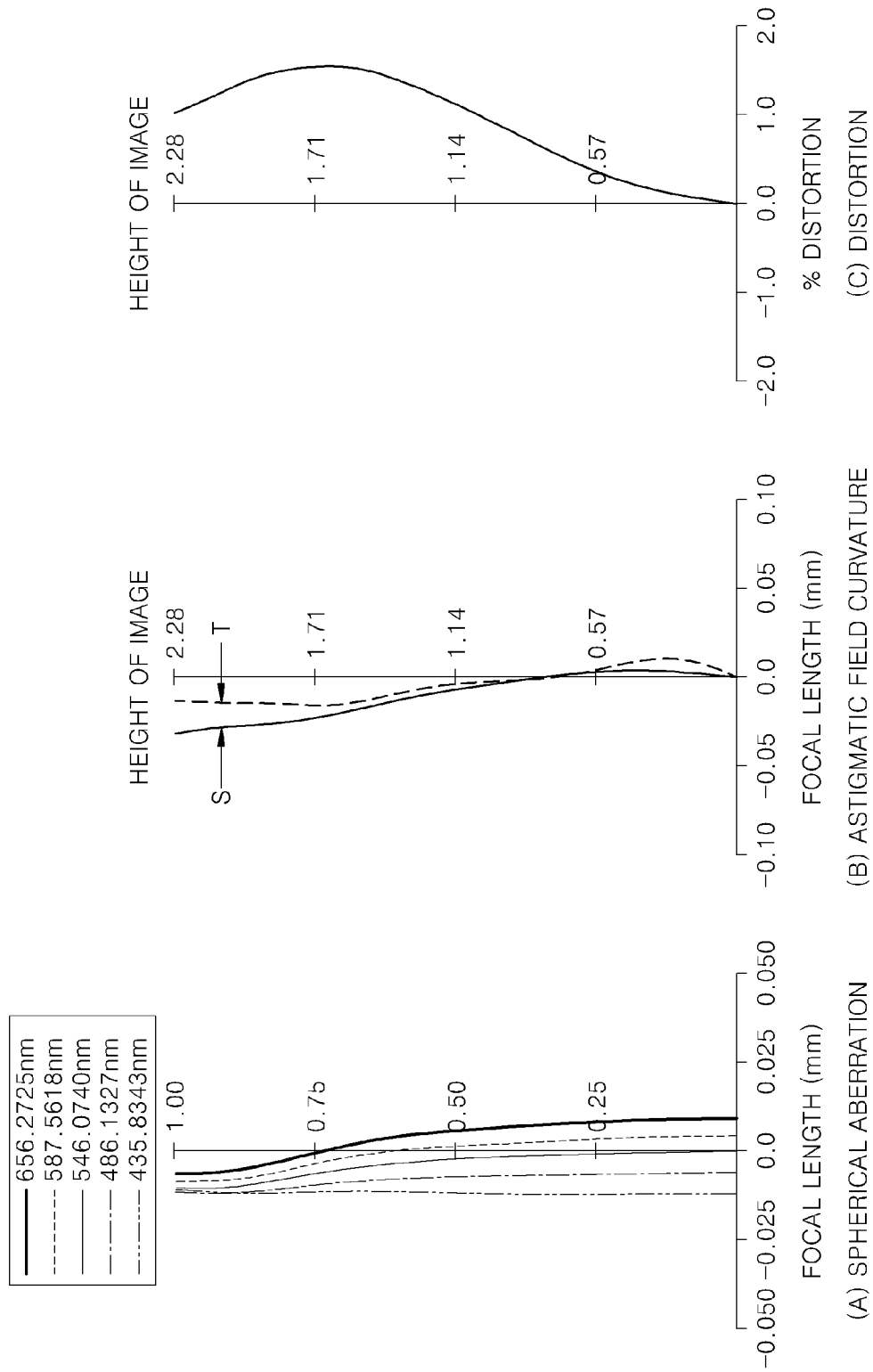

PHOTOGRAPHIC LENS OPTICAL SYSTEM

CROSS-REFERENCE TO RELATED APPLICATIONS

The present application claims priority of Korean Patent Application No. 10-2012-0036278 filed on Apr. 6, 2012, the content of which is incorporated herein by reference.

FIELD OF THE INVENTION

The present invention relates to an optical apparatus, and more particularly, to a lens optical system adopted in a camera.

BACKGROUND OF THE INVENTION

Cameras using a solid state image sensor such as a charge coupled device (CCD) and a complimentary metal oxide semiconductor (CMOS) image sensor have been rapidly distributed. To increase resolution of a camera, a degree of pixel integration of a solid state image sensor is increased. Also, the size and weight of a camera is being reduced through improvement of performance of a lens optical system included in a camera.

In a general lens optical system of a camera, a large number of lenses are used to secure performance of the lens optical system, e.g., to secure a large angle of view and to correct aberration. However, when the lens optical system includes many lenses, it may be difficult to make a compact and lightweight lens optical system. Furthermore, due to a characteristic of a camera lens, the size (or outer diameter) of the lens increases as the lens is closer to an image sensor for ensuring a light path. For an ultra slim lens optical system having a relatively short focal length, while a total length of the system decreases, the size of a lens increases and thus the outer diameter of a camera increases. In this case, it may be a problem to adopt the camera to a compact device such as a mobile phone.

Accordingly, there is a demand to develop a compact lens optical system having a relatively wide viewing angle and being able to easily correct aberration.

SUMMARY OF THE INVENTION

The present invention provides a lens optical system that is compact and lightweight and exhibits a relatively wide viewing angle and superior performance.

According to an aspect of the present invention, a lens optical system includes first, second, third, and fourth lenses that are arranged between an object and an image sensor where an image of the object is formed, in order from an object side, wherein the first lens has a positive (+) refractive power and an incident surface that is convex toward the object, the second lens has a negative (−) refractive power and both surfaces of which are concave, the third lens has a positive (+) refractive power and a meniscus shape that is convex toward the image sensor, and the fourth lens has a negative (−) refractive power and at least one of an incident surface and an exit surface of which is an aspherical surface, wherein the lens optical system satisfies the following inequality, $$3.0 < TTL/BL < 3.4,$$

wherein TTL is a distance from the incident surface of the first lens to the image sensor and BL is a distance from the exit surface of the fourth lens to the image sensor.

An effective radius RL4 of the exit surface of the fourth lens and a focal length f of the lens optical system may satisfy the following inequality, $$0.5 < RL4/f < 1.0.$$

A viewing angle θ of the lens optical system and a focal length f of the lens optical system may satisfy the following inequality, $$1.0 < \tan\theta/f < 1.5.$$

A viewing angle θ of the lens optical system and a focal length f of the lens optical system may satisfy the following inequality, $$1.0 < \tan\theta/f < 1.5.$$

An exit surface of the first lens may be convex toward the image sensor.

At least one of the first to third lenses may be an aspherical lens.

At least one of an incident surface and an exit surface of at least one of the first to third lenses may be an aspherical surface.

At least one of an incident surface and an exit surface of the fourth lens may have at least one inflection point between a center portion and an edge thereof.

The incident surface of the fourth lens may be convex toward the object at the center portion and concave toward the object around the center portion, and the exit surface of the fourth lens may be concave toward the image sensor at the center portion and convex toward the image sensor around the center portion.

The second, third, and fourth lenses may be aberration correction lenses.

The lens optical system may further include an aperture between the object and the first lens.

The lens optical system may further include an infrared blocking unit between the fourth lens and the image sensor.

At least one of the first to fourth lenses may be a plastic lens.

A viewing angle θ of the lens optical system may be about 70° or more.

According to an aspect of the present invention, a lens optical system includes first, second, third, and fourth lenses that are arranged between an object and an image sensor where an image of the object is formed, in order from an object side, wherein the first, second, third, and fourth lenses have positive (+), negative (−), positive (+), and negative (−) refractive powers, respectively, and wherein the lens optical system satisfies the following inequalities, $$3.0 < TTL/BL < 3.4, \text{ and}$$

$$0.5 < RL4/f < 1.0,$$

wherein TTL is a distance from an incident surface of the first lens to the image sensor, BL is a distance from an exit surface of the fourth lens to the image sensor, RL4 is an effective radius of the exit surface of the fourth lens, and f is a focal length of the lens optical system.

A viewing angle θ of the lens optical system and a focal length f of the lens optical system may satisfy the following inequality, $$1.0 < \tan\theta/f < 1.5.$$

The first lens may be a biconvex lens, the second lens may be a biconcave lens, the third lens may be convex toward the image sensor, and the fourth lens may be an aspherical lens.

At least one of the incident surface and the exit surface of the fourth lens may have at least one inflection point from a center portion to an edge thereof.

BRIEF DESCRIPTION OF THE DRAWINGS

The above and other features and advantages of the present invention will become more apparent by describing in detail exemplary embodiments thereof with reference to the attached drawings in which:

FIGS. 4A, 4B, and 4C are aberration diagrams respectively illustrating longitudinal spherical aberration, astigmatic field curvature, and distortion of the lens optical system of FIG. 1;

FIGS. 5A, 5B, and 5C are aberration diagrams respectively illustrating longitudinal spherical aberration, astigmatic field curvature, and distortion of the lens optical system of FIG. 2; and FIGS. 6A, 6B, and 6C are aberration diagrams respectively illustrating longitudinal spherical aberration, astigmatic field curvature, and distortion of the lens optical system of FIG. 3.

DETAILED DESCRIPTION OF THE INVENTION

Figure 1:
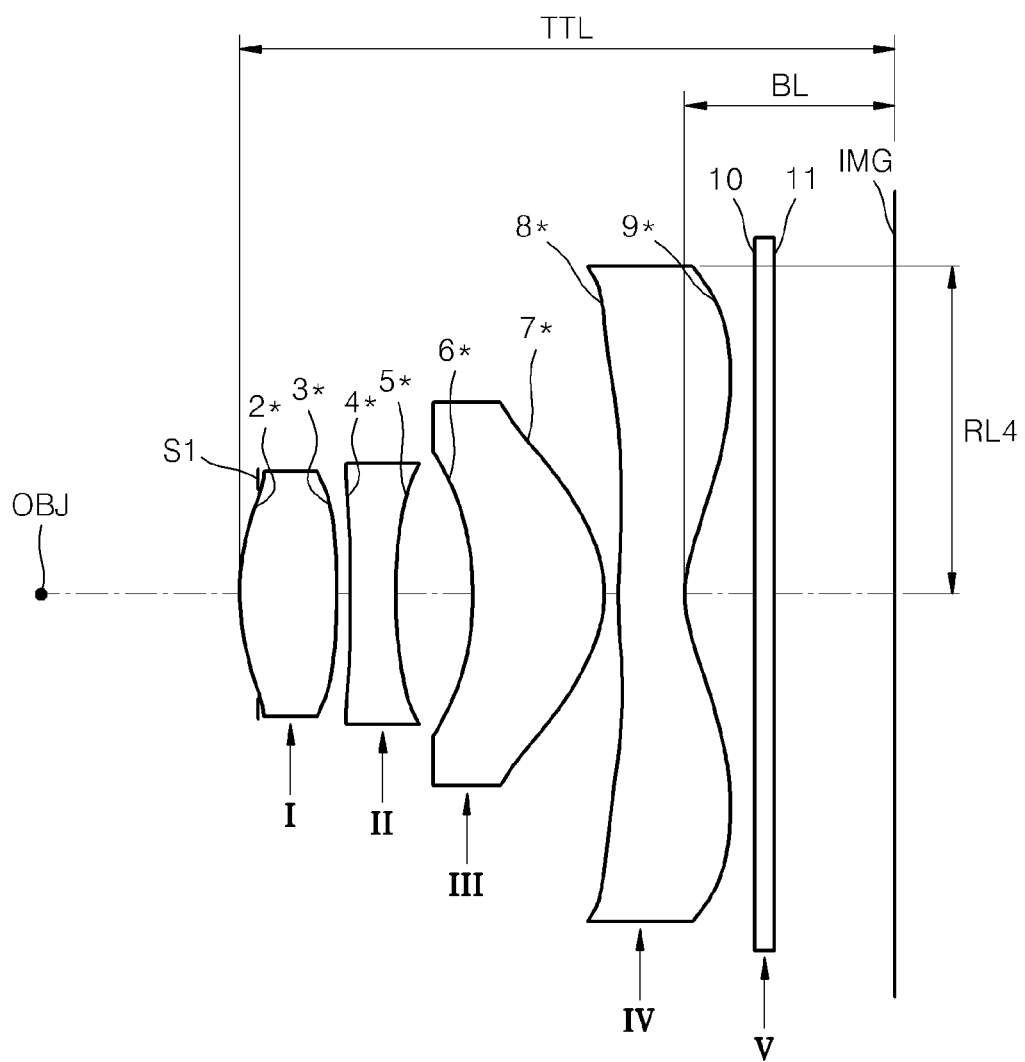
FIGS. 1 through 3 are cross-sectional views illustrating an arrangement of main elements of each of lens optical systems according to first through third embodiments of the present invention.

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements.

Figure 2:
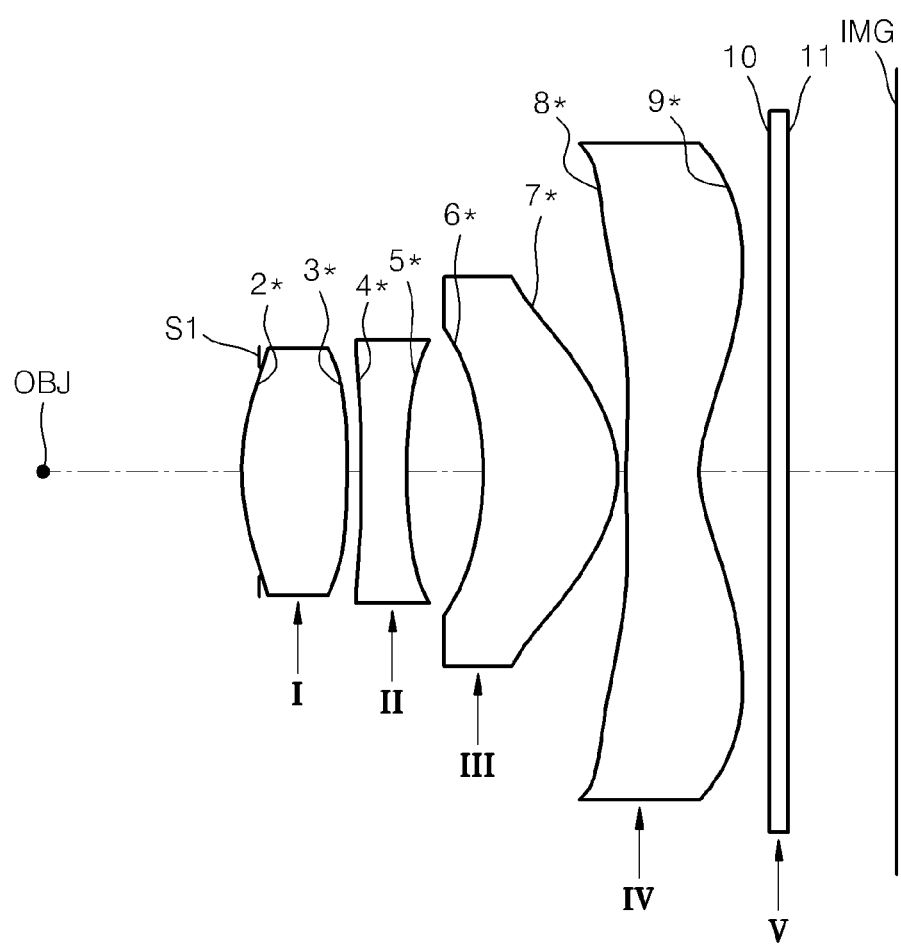
Figure 3:
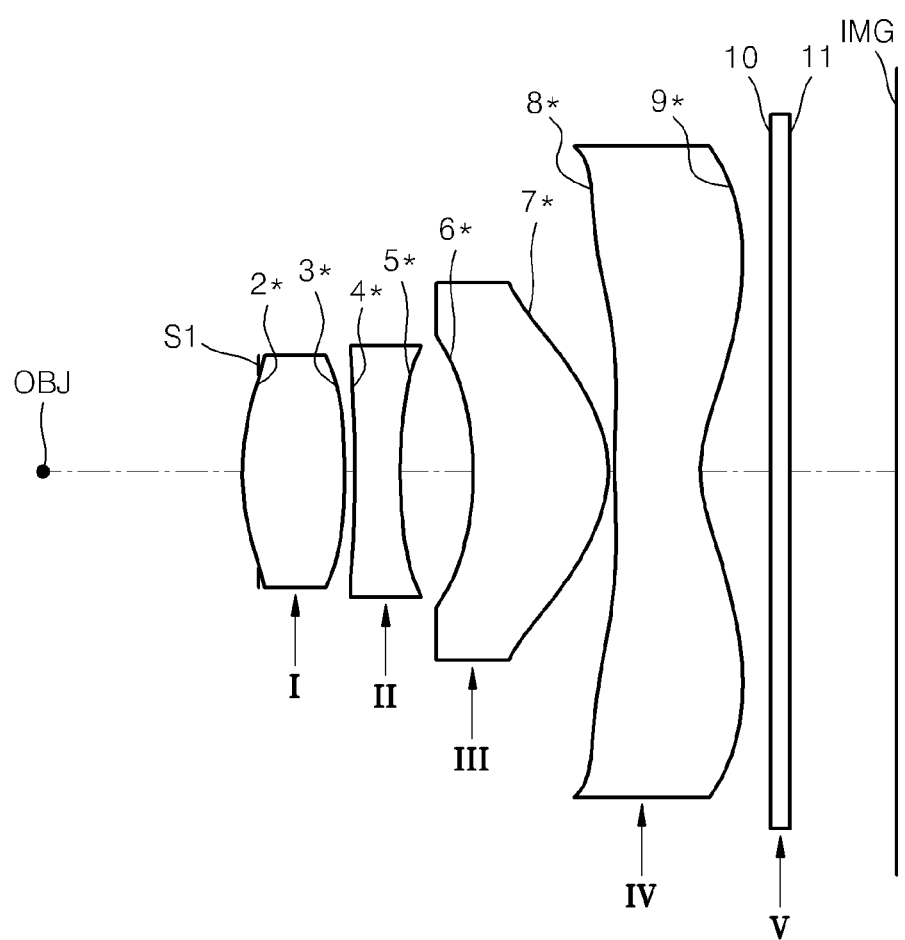

FIGS. 1 through 3 are sectional views illustrating an arrangement of main elements of lens optical systems according to first through third embodiments of the present invention.

Referring to FIGS. 1 through 3, each of the lens optical systems according to embodiments of the present invention may include a first lens I, a second lens II, a third lens III, and a fourth lens IV that are arranged between an object OBJ and an image sensor IMG where an image of the object OBJ is formed, in order from an side of the object OBJ. The first lens I may have a positive (+) refractive power. An incident surface 2* of the first lens I may be convex toward the object OBJ, whereas an exit surface 3* of the first lens I may be convex toward the image sensor IMG. Accordingly, the first lens I may be a biconvex lens. The second lens II may have a negative (−) refractive power and be a biconcave lens, that is, both of an incident surface 4* and an exit surface 5* are concave. The third lens III may have a positive (+) refractive power and be a meniscus lens that is convex toward the image sensor IMG. At least one of the first to third lenses I to III may be an aspherical lens. In other words, at least one of the incident surface 2*, 4*, or 6* and the exit surface 3*, 5*, or 7* of at least one of the first to third lenses I to III may be aspherical. For example, all incident surfaces 2*, 4*, and 6* and the exit surfaces 3*, 5*, and 7* of the first to third lenses I to III may be aspherical.

The fourth lens IV may have a negative (−) refractive power and at least one of an incident surface 8* and an exit surface 9* of the fourth lens IV may be an aspherical surface. For example, at least one of the incident surface 8* and the exit surface 9* of the fourth lens IV may be an aspherical surface having at least one inflection point between a center portion and an edge thereof. The incident surface 8* of the fourth lens IV may be convex toward the object OBJ at the center portion and concave toward the object OBJ around the center portion. The exit surface 9* of the fourth lens IV may be concave toward the image sensor IMG at the center portion and convex toward the image sensor IMG around the center portion. The first lens I may have a relatively strong positive (+) refractive power, and the second to fourth lenses II to IV may serve as aberration correction lenses.

Each of the lens optical systems according to embodiments of the present invention may further include an aperture S1 and an infrared blocking unit V. The aperture S1 may be provided at a side of the first lens I toward the object OBJ, that is, between the object OBJ and the first lens I. The infrared blocking unit V may be provided between the fourth lens IV and the image sensor IMG. The infrared blocking unit V may be an infrared blocking filter. The locations of the aperture S1 and the infrared blocking unit V may vary.

The lens optical systems according to embodiments of the present invention configured as above may satisfy at least one of Inequalities 1 to 3.

$$3.0 < TTL/BL < 3.4 \quad \text{[Inequality 1]}$$

Here, "TTL" is a distance from the incident surface 2* of the first lens I to the image sensor IMG, that is, a total length of the lens optical system. "BL" is a distance from the exit surface 9* of the fourth lens IV to the image sensor IMG. The "TTL" and "BL" are lengths on an optical axis.

Inequality 1 shows a condition for making a lens optical system compact. In Inequality 1, as the "TTL/BL" approaches an upper limit of 3.4, miniaturization of the lens optical system is facilitated. Since a rate of a decrease of the "BL" is greater than a rate of a decrease of the "TTL", as a lens optical system is made slim, the "TTL/BL" may approach the upper limit of 3.4. However, when the "TTL/BL" is greater than or equal to the upper limit of 3.4, various aberrations such as spherical aberration may be increased. In contrast, when the "TTL/BL" is less than or equal to a lower limit of 3.0, although correction of aberration is facilitated, the total length of a lens optical system increases and thus miniaturization of the lens optical system may be difficult. Thus, setting the "TTL/BL" within the above range would be advantageous for the miniaturization of a lens optical system and the correction of aberration.

$$0.5 < RL4/f < 1.0 \quad \text{[Inequality 2]}$$

Here, "RL4" is an effective radius of the exit surface 9* of the fourth lens IV, that is, a semi-aperture on a Y axis. Since the fourth lens IV has the largest outer diameter among the four lenses I-IV, it can be said that the outer diameter of the lens optical system is determined by the "RL4". In Inequality 2, "f" is an overall focal length of the lens optical system.

Inequality 2 shows a condition for controlling the outer diameter of a lens optical system. In Inequality 2, when "RL4/f" is greater than or equal to an upper limit of 1.0, although miniaturization (i.e., miniaturization in a vertical direction) of a lens optical system is facilitated, spherical aberration may be increased. In contrast, when the "RL4/f" is less than or equal to a lower limit of 0.5, although spherical aberration is facilitated, the miniaturization of the lens optical system in a vertical direction may be difficult. Typically, a focal length decreases as the outer diameter of the lens optical system increases. According to the present embodiment, a condition for reducing the "RL4" that determines the outer diameter of the lens optical system and simultaneously decreases the "f" may be obtained. As such, by reducing both of the outer diameter and the "f" of the lens optical system, miniaturization of the optical lens system in the vertical direction, that is, a direction perpendicular to the optical axis, may be easily achieved. In this regard, the lens optical system according to the present embodiment may have a small outer diameter (effective outer diameter) of about 3.9 mm. The outer diameter (effective outer diameter) of the lens optical system corresponds to a value twice the "RL4".

$$1.0 < \tan \theta/f < 1.5 \quad \text{[Inequality 3]}$$

Here, "θ" is a viewing angle of the lens optical system and "f" is a focal length of the overall lens optical system.

Inequality 3 shows a condition for determining a viewing angle of a lens optical system. In Inequality 3, when "tan θ/f" is less than or equal to a lower limit of 1.0, although spherical aberration and coma aberration are decreased, a viewing angle may be decreased as well. In contrast, when the "tan θ/f" is greater than or equal to an upper limit of 1.5, although the viewing angle is increased, the spherical aberration and coma aberration may be increased. When the condition of Inequality 3 is satisfied, a relatively wide viewing angle, for example, about 70° or more may be obtained while maintaining the spherical aberration and coma aberration in a good state.

In the above-described embodiments of FIGS. 1 through 3 (i.e., the first through third embodiments), the values of Inequalities 1 through 3 are shown in Tables 1 through 3. In Tables 1 through 3, the units of the "TTL", "BL", "RL4", and "f" are millimeters (mm). In Table 3, the unit of the viewing angle "θ" is a degree (°).

TABLE 1

|  | TTL | BL | Inequality 1 (3.0 < TTL/BL < 3.4) |
|---|---|---|---|
| 1st Embodiment | 3.739 | 1.199 | 3.118 |
| 2nd Embodiment | 3.741 | 1.131 | 3.307 |
| 3rd Embodiment | 3.736 | 1.121 | 3.332 |

TABLE 2

|  | RL4 | f | Inequality 2 (0.5 < RL4/f < 1.0) |
|---|---|---|---|
| 1st Embodiment | 1.951 | 2.950 | 0.661 |
| 2nd Embodiment | 1.956 | 2.951 | 0.662 |
| 3rd Embodiment | 1.957 | 2.945 | 0.664 |

TABLE 3

|  | θ | f | Inequality 3 (1.0 < tan θ/f < 1.5) |
|---|---|---|---|
| 1st Embodiment | 74.985 | 2.950 | 1.263 |
| 2nd Embodiment | 74.824 | 2.951 | 1.249 |
| 3rd Embodiment | 75.142 | 2.954 | 1.279 |

Referring to Tables 1 through 3, the lens optical systems of the above embodiments of FIGS. 1 through 3 may satisfy Inequalities 1 through 3.

In the lens optical systems according to the above-described embodiments configured as above, the first to fourth lenses I-IV may be formed of plastic in consideration of the shapes and dimensions thereof. In other words, all of the first to fourth lenses I-IV may be plastic lenses. In case of a glass lens, a manufacturing cost is high and conditions for forming are strict, so that it may be difficult to make a compact lens optical system. In the present invention, however, since all of the first to fourth lenses I-IV may be formed of plastic, a variety of advantages according thereto may be obtained. Nevertheless, the materials of the first to fourth lenses I-IV of the present invention are not limited to plastic. If necessary, at least one of the first to fourth lenses I-IV may be formed of glass.

The lens optical systems according to the above-described embodiments of the present invention will be described in detail with reference to lens data and the accompanying drawings.

Tables 4 through 6 each shows curvature radiuses, lens thicknesses or distances between lenses, refractive indexes, and Abbe numbers of lenses constituting the lens optical systems of FIGS. 1 through 3. In Tables 4 through 6, "R" denotes a curvature radius, "D" denotes a lens thickness of a lens interval or a distance between neighboring constituent elements, "Nd" denotes a refractive index of a lens measured by using a d-line, and "Vd" denotes an Abbe number with respect to the d-line. With respect to a lens surface number, the mark * denotes that a lens surface is aspherical. The units of "R" and "D" values are millimeters (mm).

TABLE 4

| 1st Embodiment | Surface | R | D | Nd | Vd |
|---|---|---|---|---|---|
|  | S1 | Infinity |  |  |  |
| I | 2* | 1.430 | 0.550 | 1.536 | 56.273 |
|  | 3* | −4.463 | 0.080 |  |  |
| II | 4* | −6.813 | 0.260 | 1.641 | 23.890 |
|  | 5* | 4.252 | 0.439 |  |  |
| III | 6* | −1.588 | 0.750 | 1.546 | 56.092 |
|  | 7* | −0.661 | 0.080 |  |  |
| IV | 8* | 3.355 | 0.380 | 1.534 | 55.855 |
|  | 9* | 0.669 | 0.400 |  |  |
| V | 10 | Infinity | 0.110 | 1.529 | 39.067 |
|  | 11 |  | 0.700 |  |  |
|  | IMG | Infinity |  |  |  |

TABLE 5

| 2nd Embodiment | Surface | R | D | Nd | Vd |
|---|---|---|---|---|---|
|  | S1 | infinity |  |  |  |
| I | 2* | 1.447 | 0.601 | 1.546 | 56.092 |
|  | 3* | −5.100 | 0.080 |  |  |
| II | 4* | −8.300 | 0.260 | 1.641 | 23.890 |
|  | 5* | 4.226 | 0.437 |  |  |
| III | 6* | −1.765 | 0.766 | 1.546 | 56.092 |
|  | 7* | −0.636 | 0.051 |  |  |
| IV | 8* | 6.711 | 0.413 | 1.534 | 55.855 |
|  | 9* | 0.670 | 0.400 |  |  |
| V | 10 | infinity | 0.110 | 1.529 | 39.067 |
|  | 11 |  | 0.628 |  |  |
|  | IMG | infinity |  |  |  |

TABLE 6

| 3rd Embodiment | Surface | R | D | Nd | Vd |
|---|---|---|---|---|---|
|  | S1 | infinity |  |  |  |
| I | 2* | 1.450 | 0.582 | 1.536 | 56.273 |
|  | 3* | −3.660 | 0.060 |  |  |
| II | 4* | −8.624 | 0.260 | 1.638 | 23.524 |
|  | 5* | 3.730 | 0.416 |  |  |
| III | 6* | −1.606 | 0.768 | 1.536 | 56.273 |
|  | 7* | −0.666 | 0.040 |  |  |
| IV | 8* | 6.697 | 0.487 | 1.534 | 55.855 |

TABLE 6-continued

| 3rd Embodiment | Surface | R | D | Nd | Vd |
|---|---|---|---|---|---|
| V | 9* | 0.728 | 0.400 | | |
| | 10 | infinity | 0.110 | 1.518 | 64.197 |
| | 11 | | 0.619 | | |
| | IMG | infinity | | | |

The focal length "f" and viewing angle "θ" of each lens optical system according to the first through third embodiments corresponding to FIGS. 1 through 3 are shown in Table 7.

TABLE 7

| | f [mm] | θ [°] |
|---|---|---|
| 1st Embodiment | 2.950 | 74.985 |
| 2nd Embodiment | 2.951 | 74.824 |
| 3rd Embodiment | 2.945 | 75.142 |

Also, in the lens optical systems according to the first through third embodiments of the present invention, an aspherical surface of each lens satisfies the following aspherical surface equation, that is, Equation 4.

$$x = \frac{c'y^2}{1 + \sqrt{1-(K+1)c'^2 y^2}} + Ay^4 + By^6 + Cy^8 + Dy^{10} + Ey^{12} \quad \text{[Equation 4]}$$

In Equation 4, "x" denotes a distance from the apex of a lens in a direction along an optical axis, "y" denotes a distance in a direction perpendicular to the optical axis, "c" denotes a reciprocal number (=1/r) of a curvature radius at the apex of a lens, "K" denotes a conic constant, and "A", "B", "C", "D", and "E" each denotes an aspherical surface coefficient.

Tables 8 through 10 each shows aspherical surface coefficients of aspherical surfaces of the lens optical systems according to the first through third embodiments corresponding to FIGS. 1 through 3. In other words, Tables 8 through 10 each shows aspherical coefficients of the incident surfaces 2*, 4*, 6*, and 8* and the exit surfaces 3*, 5*, 7*, and 9* of each lens of Tables 4 through 6.

TABLE 8

| Surface | K | A | B | C | D | E |
|---|---|---|---|---|---|---|
| 2* | −0.4154 | −0.0354 | −0.0206 | −0.5475 | 1.0015 | −1.6978 |
| 3* | 0.0000 | −0.0517 | −0.6187 | 0.5652 | 0.1228 | −1.2277 |
| 4* | 0.0000 | 0.1889 | −0.7989 | 1.0003 | −0.0405 | — |
| 5* | 23.0853 | 0.2336 | −0.3282 | 0.3523 | −0.0297 | — |
| 6* | 1.8980 | 0.0921 | −0.2798 | 0.6147 | −0.2341 | — |
| 7* | −4.0554 | −0.4442 | 0.6794 | −0.9179 | 0.7907 | −0.2509 |
| 8* | −34.4861 | −0.2339 | 0.1844 | −0.0747 | 0.0164 | −0.0016 |
| 9* | −5.6740 | −0.1763 | 0.1290 | −0.0705 | 0.0240 | −0.0044 |

TABLE 9

| Surface | K | A | B | C | D | E |
|---|---|---|---|---|---|---|
| 2* | −0.4032 | −0.0395 | 0.0568 | −0.8230 | 1.6880 | −2.0555 |
| 3* | 0.0000 | −0.1314 | −0.4749 | 0.5638 | 0.2349 | −1.3962 |
| 4* | 0.0000 | 0.0676 | −0.6668 | 1.2368 | −0.4807 | — |
| 5* | 21.2452 | 0.1816 | −0.2702 | 0.3619 | −0.0483 | — |
| 6* | 2.5872 | 0.0716 | −0.2403 | 0.4447 | −0.1440 | — |
| 7* | −4.0062 | −0.4216 | 0.6665 | −0.9134 | 0.7625 | −0.2320 |
| 8* | −10.8094 | −0.2587 | 0.1926 | −0.0739 | 0.0158 | −0.0015 |
| 9* | −6.0927 | −0.1743 | 0.1281 | −0.0706 | 0.0239 | −0.0044 |

TABLE 10

| Surface | K | A | B | C | D | E |
|---|---|---|---|---|---|---|
| 2* | −0.5254 | −0.0352 | −0.1444 | 0.0686 | −0.7662 | — |
| 3* | 0.0000 | −0.1284 | −0.7608 | 1.6012 | −1.4465 | — |
| 4* | 0.0000 | 0.0972 | −0.9468 | 2.1891 | −1.3051 | — |
| 5* | 7.7151 | 0.2131 | −0.3415 | 0.5315 | −0.0446 | — |
| 6* | 1.6083 | 0.0747 | −0.2836 | 0.5117 | −0.2489 | — |
| 7* | −3.8911 | −0.4510 | 0.7327 | −0.9932 | 0.8495 | −0.2665 |
| 8* | −83.2095 | −0.2489 | 0.1982 | −0.0770 | 0.0166 | −0.0016 |
| 9* | −6.1345 | −0.1691 | 0.1216 | −0.0663 | 0.0228 | −0.0044 |

FIGS. 4A, 4B, and 4C are aberration diagrams respectively illustrating longitudinal spherical aberration, astigmatic field curvature, and distortion of the lens optical system of FIG. 1, that is, the lens optical system having the values of Table 4. FIG. 4A illustrates spherical aberration of the lens optical system with respect to lights of various wavelengths. FIG. 4B illustrates astigmatic field curvature of the lens optical system, that is, a tangential field curvature T and a sagittal field curvature S. The wavelengths of light used to obtain data of FIG. 4A are 435.8343 nm, 486.1327 nm, 546.0740 nm, 587.5618 nm, and 656.2725 nm. The wavelength of light used to obtain data of FIGS. 4B and 4C is 546.0740 nm. The same conditions are applied to the lens optical systems of FIGS. 5 and 6.

FIGS. 5A, 5B, and 5C are aberration diagrams respectively illustrating longitudinal spherical aberration, astigmatic field curvature, and distortion of the lens optical system of FIG. 2, that is, the lens optical system having the values of Table 5.

FIGS. 6A, 6B, and 6C are aberration diagrams respectively illustrating longitudinal spherical aberration, astigmatic field curvature, and distortion of the lens optical system of FIG. 3, that is, the lens optical system having the values of Table 6.

As described above, the lens optical systems according to the embodiments of the present invention each may include the first to fourth lenses I-IV respectively having positive (+), negative (−), positive (+), and negative (−) refractive powers that are arranged in order from the object OBJ side toward the image sensor IMG side, and may satisfy at least any one of Inequalities 1 to 3. The lens optical system having four lenses may have a relatively short total length of about 4.0 mm or less, for example, about 3.7 mm, and an effective outer diameter of about 4.2 mm or less, for example, about 3.9 mm. Also, the lens optical system may have a relatively large viewing angle of about 70° or more, and may easily (well) correct various aberrations. Thus, according to the present invention, a lens optical system that is compact and lightweight and has a wide viewing angle and high resolution may be embodied. Furthermore, as described above, since the first to fourth lenses I-IV may be formed of plastic and at least one of two surfaces, that is, an incident surface and an exit surface, of each lens may be formed as an aspherical surface, a compact lens optical system with superior performance may be embodied at a low cost compared to a case of using a glass lens.

While this invention has been particularly shown and described with reference to exemplary embodiments thereof, it will be understood by those skilled in the art that various changes in form and details may be made therein without departing from the spirit and scope of the invention as defined by the appended claims. For example, it can be seen that those skilled in the art may easily obtain the above-described effect when at least one of Inequalities 1 through 3 are satisfied even if the shapes of the lenses in the lens optical system according to the embodiments of the present invention are slightly modified. In addition, it can be seen that a blocking film may be used as the infrared blocking unit V instead of a filter. Therefore, the scope of the invention is defined not by the detailed description of the invention but by the appended claims.

What is claimed is:

1. A lens optical system comprising first, second, third, and fourth lenses that are arranged between an object and an image sensor where an image of the object is formed, in order from an object side, wherein the first lens has a positive (+) refractive power and an incident surface that is convex toward the object, the second lens has a negative (−) refractive power and both surfaces of which are concave, the third lens has a positive (+) refractive power and a meniscus shape that is convex toward the image sensor, and the fourth lens has a negative (−) refractive power and at least one of an incident surface and an exit surface of which is an aspherical surface, wherein the lens optical system satisfies the following inequalities, $3.0 < TTL/BL < 3.4,$ $0.5 < RL4/f < 1.0,$ wherein TTL is a distance from the incident surface of the first lens to the image sensor, BL is a distance from the exit surface of the fourth lens to the image sensor, RL4 is an effective radius of the exit surface of the fourth lens, and f is a focal length of the lens optical system.

2. The lens optical system of claim 1, wherein a viewing angle θ of the lens optical system and a focal length f of the lens optical system satisfy the following inequality, $1.0 < \tan \theta/f < 1.5.$ 3. The lens optical system of claim 1, wherein an exit surface of the first lens is convex toward the image sensor.

4. The lens optical system of claim 1, wherein at least one of the first to third lenses is an aspherical lens.

5. The lens optical system of claim 1, wherein at least one of an incident surface and an exit surface of at least one of the first to third lenses is an aspherical surface.

6. The lens optical system of claim 1, wherein the second, third, and fourth lenses are aberration correction lenses.

7. The lens optical system of claim 1, further comprising an aperture between the object and the first lens.

8. The lens optical system of claim 1, further comprising an infrared blocking unit between the fourth lens and the image sensor.

9. The lens optical system of claim 1, wherein at least one of the first to fourth lenses is a plastic lens.

10. The lens optical system of claim 1, wherein a viewing angle θ of the lens optical system is about 70° or more.

11. The lens optical system of claim 1, wherein at least one of an incident surface and an exit surface of the fourth lens has at least one inflection point between a center portion and an edge thereof.

12. The lens optical system of claim 11, wherein the incident surface of the fourth lens is convex toward the object at the center portion and concave toward the object around the center portion, and the exit surface of the fourth lens is concave toward the image sensor at the center portion and convex toward the image sensor around the center portion.

13. A lens optical system comprising first, second, third, and fourth lenses that are arranged between an object and an image sensor where an image of the object is formed, in order from an object side, wherein the first, second, third, and fourth lenses have positive (+), negative (−), positive (+), and negative (−) refractive powers, respectively, and wherein the lens optical system satisfies the following inequalities, $3.0 < TTL/BL < 3.4,$ and $0.5 < RL4/f < 1.0,$ wherein TTL is a distance from an incident surface of the first lens to the image sensor, BL is a distance from an exit surface of the fourth lens to the image sensor, RL4 is an effective radius of the exit surface of the fourth lens, and f is a focal length of the lens optical system.

14. The lens optical system of claim 13, wherein a viewing angle θ of the lens optical system and a focal length f of the lens optical system satisfy the following inequality, $1.0 < \tan \theta/f < 1.5.$ 15. The lens optical system of claim 13, wherein the first lens is a biconvex lens, the second lens is a biconcave lens, the third lens is convex toward the image sensor, and the fourth lens is an aspherical lens.

* * * * *